United States Patent [19]

Latsko

[11] Patent Number: 5,178,248
[45] Date of Patent: Jan. 12, 1993

[54] COUPLING ASSEMBLY

[75] Inventor: James M. Latsko, North Royalton, Ohio

[73] Assignee: Eaton Corporation, Cleveland, Ohio

[21] Appl. No.: 788,541

[22] Filed: Nov. 6, 1991

[51] Int. Cl.$^5$ .............................................. F16D 67/04
[52] U.S. Cl. .............................. 192/12 C; 192/88 B; 188/72.3; 188/170
[58] Field of Search ..................... 192/12 C, 15, 18 A, 192/85 A, 88 B, 91 A; 188/72.3, 73.45, 170

[56] References Cited

U.S. PATENT DOCUMENTS

| | | | |
|---|---|---|---|
| 2,897,924 | 8/1959 | Fawick | 192/88 B X |
| 3,805,931 | 4/1974 | Portmann | 192/18 A |
| 4,562,907 | 1/1986 | Maeda | 192/18 A |
| 4,785,926 | 11/1988 | Matson | 192/18 A |
| 4,874,068 | 10/1989 | Collins et al. | 192/18 A |

FOREIGN PATENT DOCUMENTS

| | | | |
|---|---|---|---|
| 468670 | 10/1950 | Canada | 192/12 C |
| 45-30492 | 10/1970 | Japan | 188/170 |
| 304372 | 6/1971 | U.S.S.R. | 192/18 A |

OTHER PUBLICATIONS

Drawing illustrating a coupling assembly which was in public use more than one year prior to filing date of the above-identified application.

Primary Examiner—Richard Lorence
Attorney, Agent, or Firm—Tarolli, Sundheim & Cove

[57] ABSTRACT

A coupling assembly includes a clutch assembly and a brake assembly. The brake assembly includes an annular piston which is formed as one piece with a base member. An annular cylinder chamber is formed as one piece with a second member and telescopically receives the annular piston. Force transmitting surfaces on the two members engage opposite sides of a friction disk. The annular piston and cylinder extend around the outside of the friction disk to at least partially block a flow of contaminants in a radially inward direction toward the friction disk. Passages are formed in a lower portion of the annular piston to accommodate a flow of cooling fluid and to enable any contaminants which enter the brake assembly to flow out of the brake assembly. The brake assembly is advantageously urged to an engaged condition by spring assemblies which include posts and spring elements which extend into a space between the clutch assembly and a flange portion of a flywheel. Arcuate spring retainer elements extend between outer end portions of the posts to hold the spring elements in place on the posts. The clutch assembly is operated from a disengaged condition to an engaged condition by fluid pressure conducted from the brake assembly.

49 Claims, 5 Drawing Sheets

COUPLING ASSEMBLY

BACKGROUND OF THE INVENTION

The present invention relates to a new and improved coupling assembly which is utilized to transmit force to either rotate a member or hold the member against rotation.

A known coupling assembly is utilized to either rotate a machine input shaft or to hold the machine input shaft against rotation. This coupling assembly includes a flywheel which is connected with a machine input shaft by a clutch assembly to rotate the machine input shaft when a brake assembly is in a disengaged condition. When the clutch assembly is in a disengaged condition, the brake assembly holds the machine input shaft against rotation.

The brake assembly utilized in this known coupling assembly is of the drum type and includes a pair of pivotally interconnected brake shoes which are pressed against a brake drum by springs. A fluid piston/cylinder chamber is operable to actuate the brake assembly to a disengaged condition.

The brake and clutch assemblies in this known coupling assembly are sequentially operated upon actuation of a control valve to simultaneously direct fluid pressure to both the brake assembly and the clutch assembly. Thus, upon actuation of the control valve, the clutch assembly is operated from the disengaged condition to the engaged condition at a low pressure, for example, 10 psi. The brake assembly is subsequently operated from the engaged condition to the disengaged condition at a higher pressure, for example, 65 psi.

Although generally satisfactory in its mode of operation, this known coupling assembly may be considered to be inadequate for certain uses due to an inability of the brake assembly to consistently provide adequate braking effort. This is particularly true when the coupling assembly is used in an environment in which the brake assembly is exposed to contaminants. Thus, machine lubricating oil is a contaminant when it enters the brake assembly. The lubricating oil decreases the force which the brake assembly can exert to stop a rotating input shaft or member. Although it is desirable to keep lubricating oil out of the brake assembly, cooling air should circulate through the brake assembly in order to prevent brake fade during extensive use. In addition, it is desirable to maintain the spring force which actuates the brake assembly as constant as possible with wear of the brake shoes.

SUMMARY OF THE INVENTION

An improved coupling is used as a brake assembly. However, the coupling could be used as a clutch assembly if desired. The brake assembly includes an annular piston which extends axially outwardly from a first or base member. The annular piston extends into an annular cylinder formed in a second member.

Radially extending force transmitting surfaces are disposed radially inwardly of the piston and cylinder. The force transmitting surfaces engage opposite sides of a friction disc. The force transmitting surfaces are pressed against the friction disc by a spring assembly. The annular piston and cylinder cooperate to at least partially block a flow of contaminants in a radially inward direction toward the force transmitting surfaces and friction disc.

Cooling air for the brake assembly can flow through passages which extend radially through the piston. The cooling air passages are only formed in the lower half of the annular piston. Therefore, contaminants cannot enter the passages under the influence of gravity. However, contaminants can flow out of the brake assembly through the passages under the influence of gravity.

The spring assembly includes an annular array of axially extending posts. Springs are disposed on the posts. Arcuate spring retainer elements are mounted on the posts to hold the springs in place. In order to disengage the brake assembly against the influence of the spring assembly, axially extending passages are formed in the annular piston to enable fluid to be conducted under pressure into the chamber formed between the piston and cylinder.

Although the brake assembly could be used in many different environments, it is preferred to use the brake assembly in a coupling assembly which includes a flywheel and a clutch assembly. When the clutch assembly is engaged, force is transmitted from the flywheel through the clutch assembly to a driven member. When the clutch assembly is disengaged, the brake assembly holds the driven member against rotation. In order to make the coupling assembly as compact as possible, the brake spring assembly extends into an annular space located between the clutch assembly and a flange on the flywheel.

The clutch assembly is operated from a disengaged condition to an engaged condition after fluid pressure in the brake assembly has increased to a fluid pressure sufficient to at least initiate operation of the brake assembly to a disengaged condition. Thus, fluid pressure for operating the clutch assembly is conducted from a cylinder chamber in the brake assembly. A valve is operated under the influence of fluid pressure in the brake cylinder chamber to enable fluid pressure to be conducted from the brake cylinder chamber to the clutch assembly after a predetermined pressure has been obtained in the brake cylinder chamber.

BRIEF DESCRIPTION OF THE DRAWINGS

The foregoing and other features of the invention will become more apparent upon a consideration of the following description taken in connection with the accompanying drawings wherein.

DESCRIPTION OF ONE SPECIFIC PREFERRED EMBODIMENT OF THE INVENTION

Figure 1:
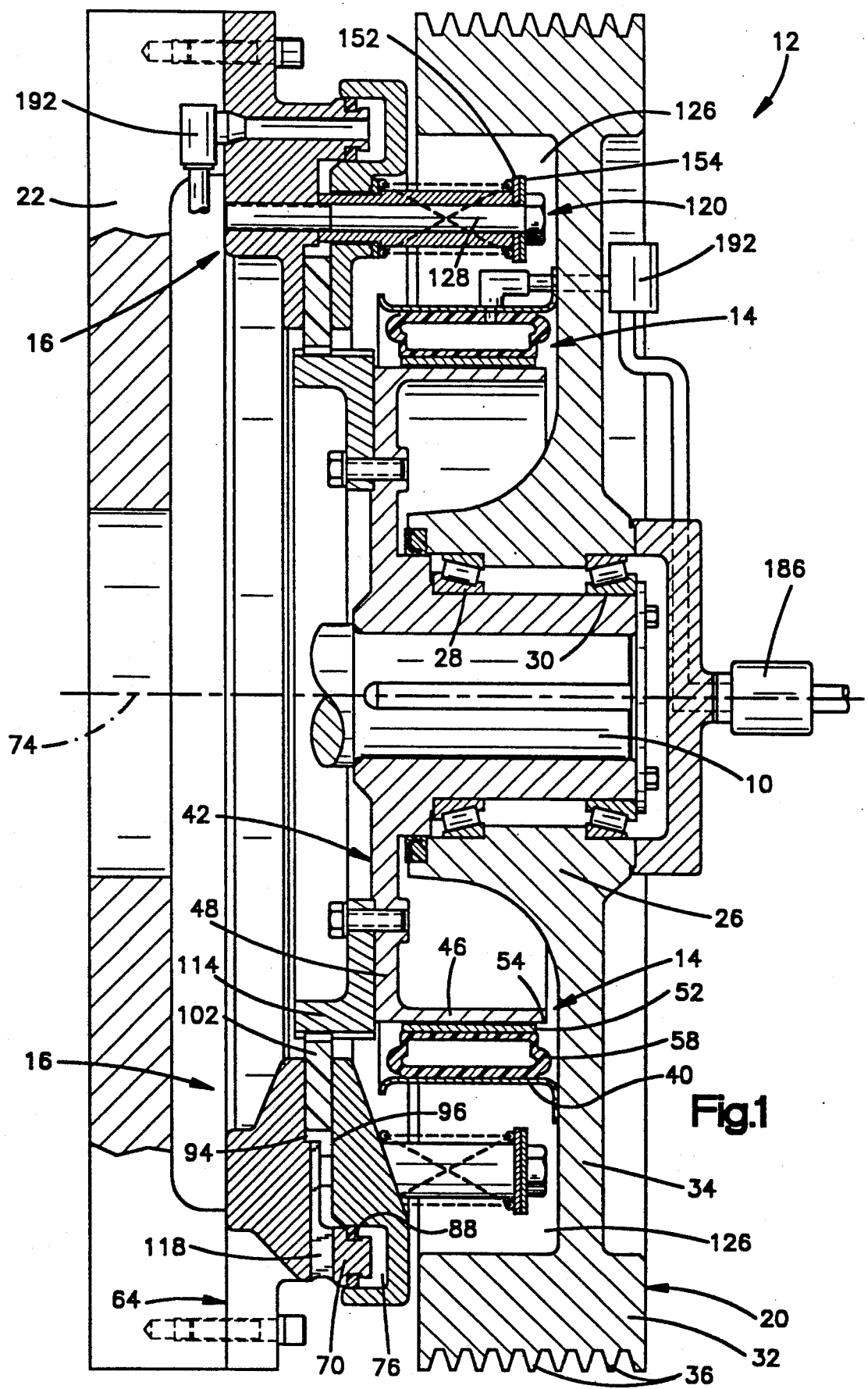
FIG. 1 is a sectional view of a coupling assembly constructed in accordance with the present invention and illustrating the relationship between a flywheel, a clutch assembly, and an improved brake assembly.

A machine input shaft or force transmitting member 10 (FIGS. 1 and 2) is either rotated by or held against rotation by an improved coupling assembly 12. The coupling assembly 12 includes a clutch assembly 14 and an improved brake assembly 16. The clutch assembly 14 is operable to transmit force to rotate the machine input shaft 10. The improved brake assembly 16 is operable to hold the machine input shaft 10 against rotation.

When the clutch assembly 14 is engaged and the brake assembly 16 is disengaged, force is transmitted from a flywheel 20 through the clutch assembly 14 to rotate the machine input shaft 10. When the brake assembly 16 is engaged and the clutch assembly 14 is disengaged, force is transmitted from a stationary frame or base 22 through the brake assembly 16 to hold the machine input shaft 10 against rotation. A sheet metal housing (not shown) encloses the mounting side of the brake assembly.

The one-piece circular flywheel 20 is rotated at a constant speed by a plurality of drive belts (not shown). The flywheel 20 (FIGS. 1 and 2) includes a circular central hub portion 26 which is rotatably supported by a pair of annular bearing assemblies 28 and 30. An annular, axially extending, flange portion 32 of the flywheel 20 extends around the hub portion 26. The annular flange portion 32 is connected with the hub portion 26 by a radially extending web or connector section 34.

The flange portion 32 of the flywheel 20 extends axially from the annular web section 34 toward the brake assembly 16. The flange portion 32 includes a plurality of annular V-grooves 36 which are engaged by drive belts (not shown). The drive belts cooperate with the flange portion 32 of the flywheel 20 to continuously rotate the flywheel about its central axis.

A clutch assembly 14 is connected with the flywheel 20 and with the machine input shaft 10. Thus, the clutch assembly 14 includes a rigid annular base 40 (FIG. 2) which is fixedly connected to the web section 34 of the flywheel 20. A circular clutch drum 42 has a cylindrical hub 44 which is fixedly secured to the machine input shaft 10. The bearing assemblies 28 and 30, which rotatably support the flywheel 20, are disposed on the outside of the clutch drum hub 44. A cylindrical outer side wall 46 of the clutch drum 42 is disposed in a coaxial relationship with the hub 44. The cylindrical side wall 46 is connected with the hub 44 by an annular radially extending web or end wall 48.

An annular array of friction shoes 52 is engageable with a cylindrical outer side surface 54 (FIG. 2) formed on the side wall 46 of the clutch drum 42. An annular fluid extensible tube 58 is disposed between the base 40 and the annular array of friction shoes 52. The tube 58 is expandable radially inwardly to press the friction shoes 52 against the cylindrical friction surface 54 formed on the outside of the clutch drum 42. When the friction shoes 52 are pressed against the friction surface 54, force is transmitted from the flywheel 20 through the base 40, tube 58, friction shoes 52 and clutch drum 42 to the machine input shaft 10. This force rotates the machine input shaft with the flywheel 20.

In the illustrated embodiment of the invention, the tube 58 is extendible radially inwardly to press the friction shoes 52 against the friction surface 54 formed on the outside of the clutch drum 42. If desired, the base 40 and tube 58 could be arranged inside of the clutch drum 42 to press the friction shoes 52 radially outwardly against a friction surface on the inside of the clutch drum. The construction and mode of operation of the clutch assembly 14 is similar to the disclosures in U.S. Pat. Nos. 3,092,231; 4,190,136 and 4,795,013.

The improved brake assembly 16 is connected with the machine input shaft or force transmitting element 10 and the stationary frame or base 22. The brake assembly 16 includes a pair of annular members 64 and 66. The first annular member 64 is fixedly connected to the stationary frame or base 22. An annular piston 70 extends axially outwardly from the annular member 64 and is formed as one piece with the annular member. The annular member 64 and the annular piston 70 have central axes which are coincident with an axis 74 about which the flywheel 20 of the machine input shaft 10 rotates.

An annular cylinder chamber 76 is formed in the second member 66. Thus, inner and outer cylindrical side surfaces 78 and 80 (FIGS. 2 and 3) on the second annular member 66 cooperate with an annular end surface 82 to define the cylinder chamber 76. The piston 70 extends telescopically into the cylinder chamber 76 and blocks one end of the cylinder chamber. The cylinder chamber 76 holds fluid which is conducted to and from the cylinder chamber through an axial passage 86 formed in the piston 70 and the annular member 64. Although only a single passage 86 has been shown in FIGS. 2 and 3, it should be understood that a plurality of passages, specifically three, are provided at equally spaced locations about the annular piston 70 to conduct fluid pressure to and from the annular cylinder chamber 76.

An annular inner seal ring 88 is disposed between a radially inner side of the annular piston 70 and the cylindrical surface 78. A second annular seal ring 90 is disposed between a radially outer side of the annular piston 70 and the cylindrical surface 80. The seal rings 88 and 90 cooperate with the annular piston 70 and the side walls 78 and 80 of the annular cylinder chamber 76 to block leakage of fluid from the cylinder chamber.

An annular radially extending force transmitting surface 94 (FIGS. 2 and 3) is formed on the member 64 and extends radially inwardly away from the annular piston 70. Similarly, an annular force transmitting surface 96 is formed on the member 66 and extends radially inwardly away from the annular cylinder chamber 76. Although the annular force transmitting surfaces 94 and 96 have been shown as being formed directly on the members 64 and 66, they could be formed separately from the members 64 and 66 if desired. The annular force transmitting surfaces 94 and 96 have central axes which are coincident with the axis 74 about which the flywheel 20 and machine input shaft 10 rotate.

An annular friction disc 102 is disposed between the force transmitting surfaces 94 and 96. Thus, parallel annular side surfaces 104 and 106 (FIGS. 2 and 3) on the friction disc 102 are disposed in flat abutting engagement with the force transmitting surfaces 94 and 96 on the members 64 and 66. An annular series of teeth 110 on a radially inner portion of the friction disc 102 are disposed in meshing engagement with an annular series of teeth 112 formed on a radially outer portion of an annular mounting member 114. The teeth 110 on the friction disc 102 cooperate with the teeth 112 on the mounting member 114 to hold the friction disc against rotation relative to the mounting member. The mounting member 114 is fixedly secured to the end wall 48 of the clutch drum 42.

When the brake assembly 16 is in the engaged condition, the annular force transmitting surfaces 94 and 96 on the members 64 and 66 abuttingly engage the parallel friction surfaces 104 and 106 on opposite sides of the annular friction disc 102 to hold the friction disc against rotation. Due to the transmission of force from the friction disc 102 through the teeth 110 and 112 to the mounting member 114, the mounting member is also held against rotation. The mounting member 114 is fixedly connected to the clutch drum 42. Therefore, the clutch drum 42 and machine input shaft 10 are held against rotation when the brake assembly 16 is in the engaged condition. When the brake assembly 16 is disengaged, the force transmitting surfaces 94 and 96 are slightly spaced from the friction surfaces 104 and 106. Therefore, the friction disc 102, mounting member 114, clutch drum 42 and machine input shaft 10 are free to rotate about the axis 74.

The annular piston 70 and the annular cylinder 76 cooperate to at least partially block a radially inward flow of contaminants toward the force transmitting surfaces 94 and 96 and the friction disc 102. Thus, the piston 70 extends across the space between the members 64 and 66. Since the piston 70 has an annular configuration and extends completely around the friction disc 102, the piston blocks a radially inward flow of contaminants toward the friction disc.

During repeated or prolonged engagement of the brake assembly 16, brake fade with a resulting loss of braking effort, tends to occur. In order to prevent brake fade from occurring, a plurality of radially extending passages 118 (FIG. 3) are formed in the lower portion of the piston 70. Thus, the passages 118 are formed in the piston 70 at a plurality of locations disposed below the horizontal plane extending through the axis 74 of rotation of the flywheel 20 and machine input shaft 10. The passages 118 have longitudinally extending central axes which are radially aligned with the friction disc 102. Although any desired number of passages 118 could be provided, in one embodiment of the invention, there were seven passages 118 at evenly spaced apart locations in the lower portion of the piston 70. The passages 118 conduct a flow of cooling air which passes around the members 64 and 66 to remove heat generated by a braking action.

One of the passages 118 is formed with a slightly larger cross sectional area than the other passages. This passage is used to visually inspect the friction disc 102 to determine the extent of wear of the friction disc. Thus, a passage 118 which is readily accessible, has a relatively large transverse cross sectional area through which the friction disc 102 can be viewed. Although the passages could have a cylindrical transverse cross sectional configuration, in one specific embodiment of the invention, the passages 118 had a rectangular transverse cross sectional configuration.

The passages 118 also enable contaminants to flow from the radially inner side of the piston 70 to a radially outer side of the piston under the influence of gravity, centrifugal force, and windage. Since the coupling assembly 12 is utilized in association with a machine which is well lubricated, it is believed that at least a limited amount of lubricating liquid and/or other contaminants may be available to enter the brake assembly 16. The passages 118 enable these contaminants to flow out of the interior of the brake assembly 16. Although the passages 118 theoretically provide access for contaminants to the enter the interior of the brake assembly 16, contaminants do not enter the interior of the brake assembly through the passages 118. This is because the passages 118 are in the lower portion of the piston 70, thus not allowing gravity to induce contaminant flow into the interior of the brake. Also, compared to the total peripheral surface area of the piston 70, the passages 118 have a relatively small transverse cross section.

An annular spring assembly 120 (FIG. 4) is provided to urge the force transmitting surfaces 94 and 96 (FIG. 3) on the members 64 and 66 against the friction surfaces 104 and 106 on the friction disc 102. The annular spring assembly 120 includes a plurality of spring subassemblies 124 which are disposed in an annular array and extend into an annular space 126 (FIGS. 1 and 2) formed between the clutch assembly 14 and the flange portion 32 of the flywheel 20. The spring subassemblies 124 are connected with the stationary members 64 and 66 of the brake assembly 16.

When the brake assembly 16 is in a disengaged condition, the flywheel 20, clutch assembly 14, and friction disc 102 may rotate relative to the members 64 and 66 and the spring subassemblies 124. When the brake asembly 16 is engaged and the clutch assembly 14 is disengaged, the friction disc 102, clutch drum 42 and machine input shaft 10 are stationary. However, the annular base 40, fluid extensible tube 58 and annular array of friction shoes 52 rotate with the flywheel relative to the stationary spring subassemblies 124. Therefore, it is important to have the spring subassemblies 124 disposed in the annular space 126 at a location in which they do not engage any part of the flywheel 20 or clutch assembly 14 during rotation of the flywheel and clutch assembly. By having the spring assembly 120 extend into the annular space 126 which is disposed radially inwardly of the flange portion 32 of the flywheel 20, a compact relationship is obtained between the flywheel and the brake assembly 16.

Each of the spring subassemblies 124 includes an axially extending spring post or bolt 128 (FIG. 3) having a threaded inner end portion 130 which is fixedly secured to the annular member 64 and outer end portion with a relatively large head 132. A cylindrical tube 136 is clamped between the head end portion 132 of the spring post 128 and the member 64. Tubular bushings of a low friction material may be provided between the tube 136 and the member 66 to facilitate relative movement between the tube 136 and member 66.

A cylindrical coil spring 138 extends around the tube 136. A washer 142 is provided between the inner end portion of the coil spring 138 and the member 66. The coil springs 138 are relatively long, low rate springs which maintain a substantially constant spring force with wear of the friction disc 102. This minimizes the need for adjustment of the spring assembly 120 with friction disc wear.

A radially extending shoulder 146 o the tube 136 cooperates with the washer 142 to limit the extent of axially outward (toward the right as viewed in FIG. 3) movement of the member 66 away from the member 64. The coil spring 138 continuously presses against the washer 142 to constantly urge the member 66 toward the member 64. This presses the force transmitting surfaces 94 and 96 on the members 64 and 66 firmly against the friction surfaces 104 and 106 on the friction disc 102.

An inner spring retainer element 152 (FIG. 3) engages the outer end portion of the coil spring 138. An outer spring element 154 engages the head portion of the spring post 128. The identical spring retainer elements 152 and 154 cooperate with the spring post 128 to hold the coil spring 138 in place. In addition, the retainer elements 152 and 154 cooperate with adjacent spring subassemblies 124 to hold the coil spring 138 in place if for some unforseen reason the spring post 128 should break.

Figure 4:
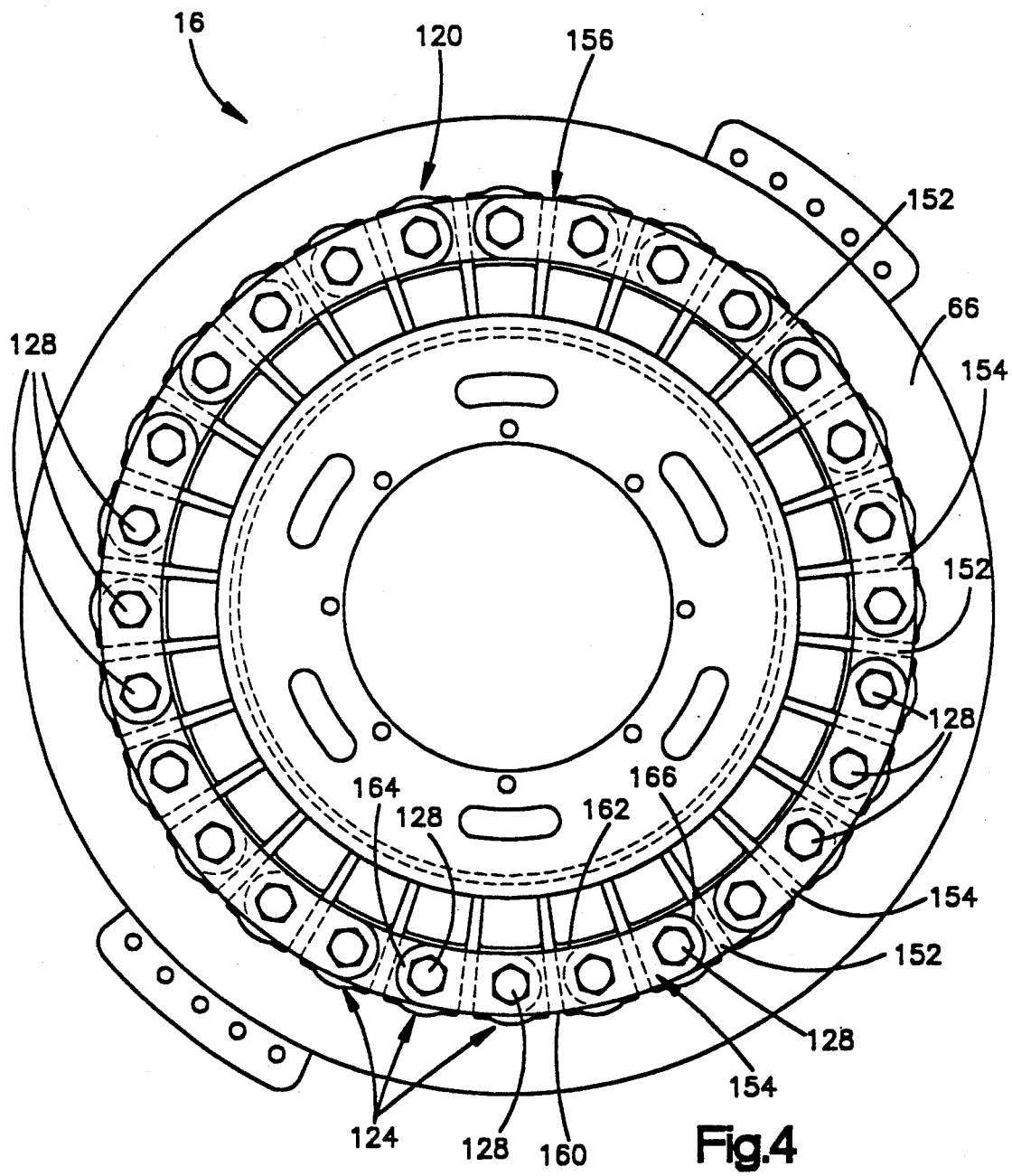
FIG. 4 is a plan view, taken generally along the line 4—4 of FIG. 3, further illustrating the construction of the brake assembly

The inner and outer spring retainer elements 152 and 154 cooperate with the spring posts 128 to provide a continuous annular array 156 of spring retainer elements (FIG. 4). The arcuate configuration of each of the outer spring retainer elements 154 is clearly visible in FIG. 4. Thus, the outer spring retainer element 154 includes an arcuate radially outer side surface 160 and an arcuate radially inner side surface 162. The arcuate radially outer and inner side surfaces 160 and 162 are interconnected by end surfaces 164 and 166. Four holes are formed in each spring retainer element 154 to enable four spring posts 128 to extend through the spring retainer element. Since the spring retainer element 154 is connected with a plurality of the spring posts 128, if any one of the spring posts should break or otherwise fail, the spring retainer element will be held in place by the adjacent spring posts.

The inner spring retainer elements 152 have the same configuration as the outer spring retainer elements 154. Thus, the inner spring elements 152 are provided with four holes and cooperate with four spring posts. However, one of the outer spring retainer elements 154 engages only two of the four posts engaged by any one of the inner spring retainer elements 152. The other two posts engaged by an outer spring retainer element 154 are engaged by a second inner spring retainer element 152.

Figure 2:
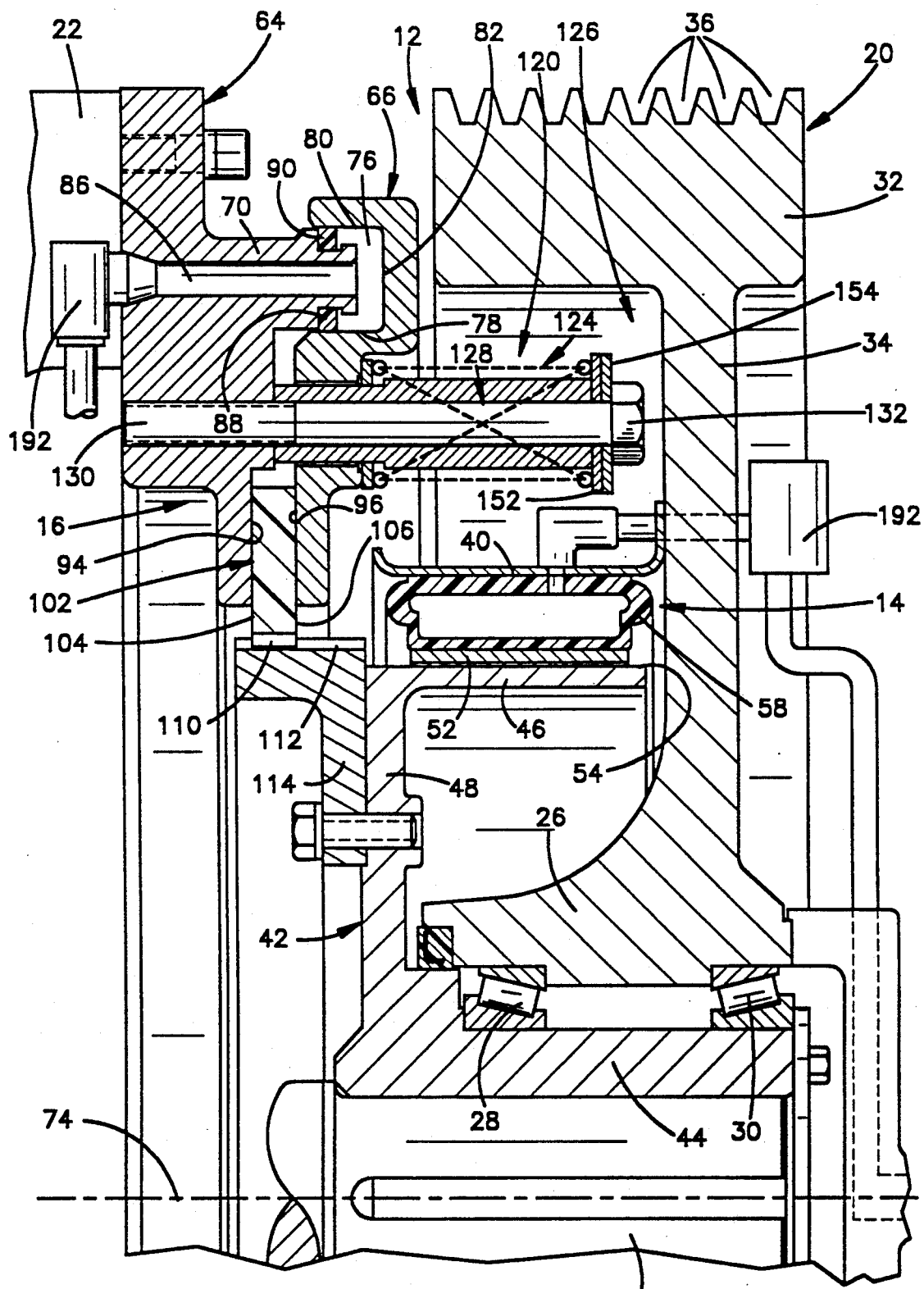
FIG. 2 is an enlarged view of a portion of the coupling assembly of FIG. 1.
Figure 3:
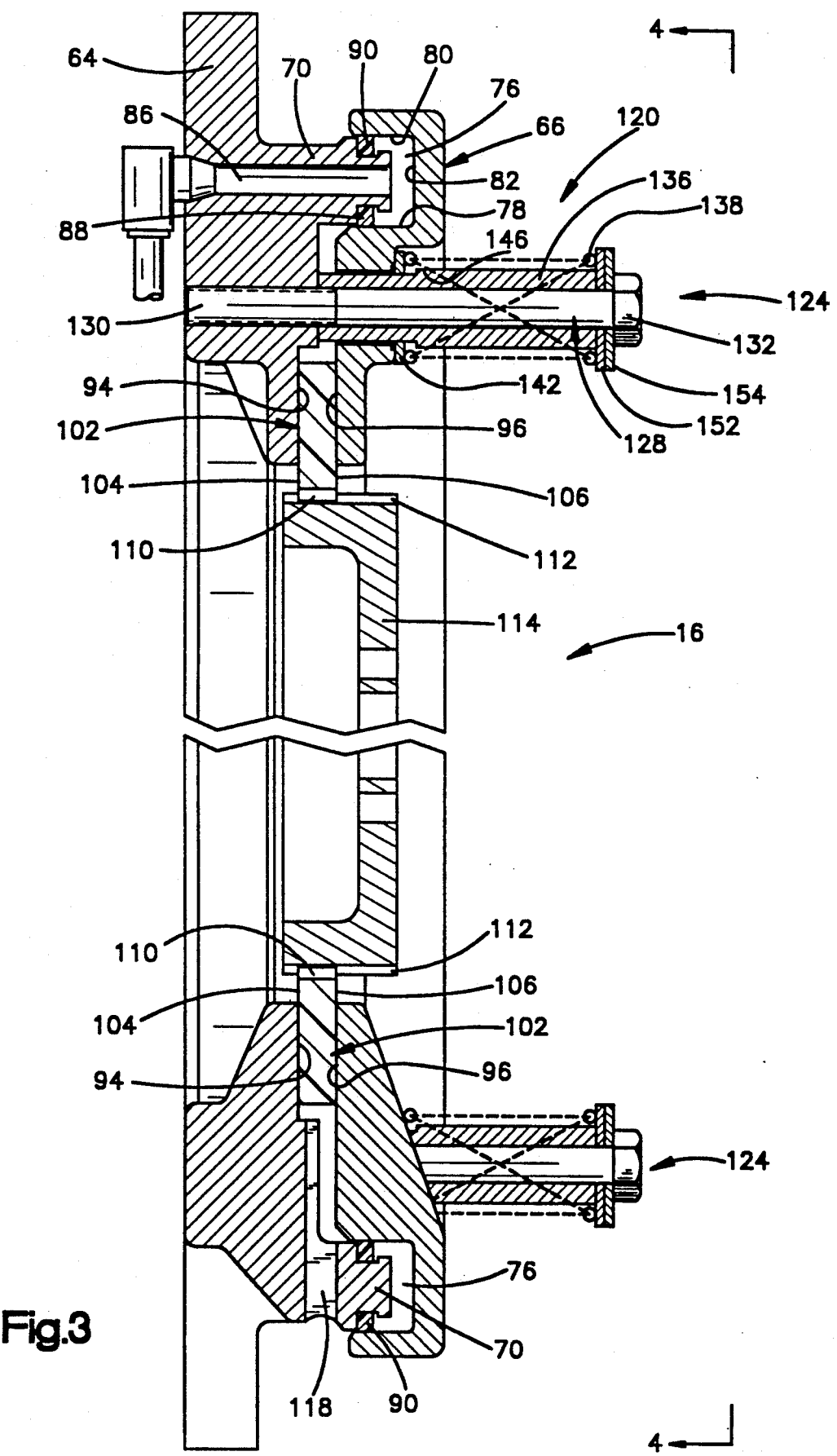
FIG. 3 is an enlarged sectional view of the improved brake assembly used in the coupling assembly of FIGS. 1 and 2.

The inner and outer spring retainer elements 152 and 154 are offset relative to each other in the circular array 156 (FIG. 4) of spring retainer elements by an amount corresponding to two spring posts 128. Thus, each outer spring retainer element 154 overlaps two inner spring retainer elements 152. Similarly, each inner spring retainer element 152 underlaps two outer spring retainer elements 154. Since the spring retainer elements 152 and 154 are on the outer end portions of the spring posts 128, they are disposed in the annular space 126 between the flange portion 32 of the flywheel 20 and the base 40 of the clutch assembly 14 (FIG. 2).

Figure 5:
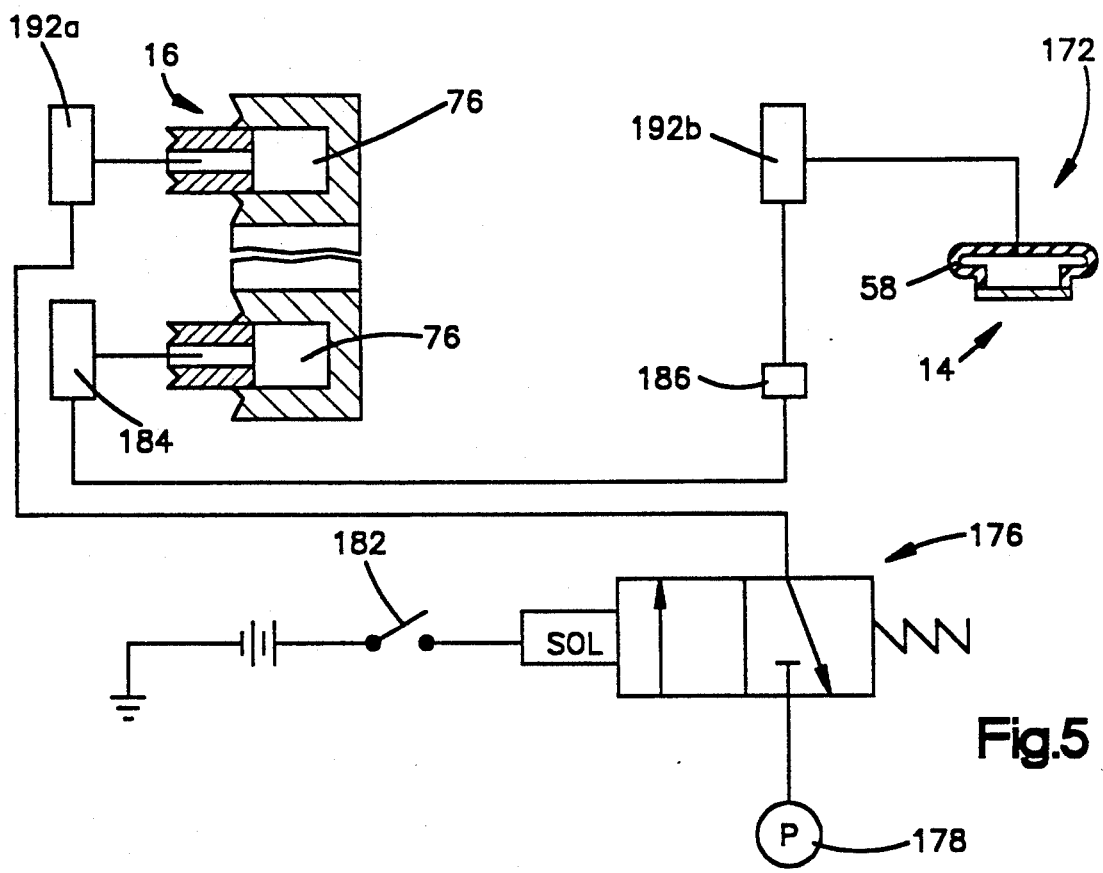
FIG. 5 is a schematic illustration of control circuitry utilized with the coupling assembly of FIG. 1.

Control circuitry 172 for effecting disengagement of the brake assembly 16 and, immediately thereafter, engagement of the clutch assembly 14 and for effecting disengagement of the clutch assembly upon engagement of the brake assembly is illustrated in FIG. 5. The control circuitry 172 includes a solenoid valve 176 which is connected with a source of air pressure, such as an accumulator and/or pump 178. The solenoid valve 176 is connected with the brake assembly 16. The solenoid valve 176 is connected in fluid communication with the clutch assembly 14 through the brake assembly 16. When the solenoid valve 176 is in the unactuated condition shown in FIG. 5, both the clutch assembly 14 and brake assembly 16 are vented to atmosphere.

When the clutch assembly 14 is vented to atmosphere, the fluid extensible tube 58 is retracted and the clutch assembly is in the disengaged condition. When the brake assembly 16 is vented to atmosphere, the spring assembly 120 operates the brake assembly to the engaged condition. Thus, the friction disc 102 is clamped between the friction surfaces 94 and 96 on the members 64 and 66 by the spring assembly 120 to hold the machine input shaft 10 against rotation. At this time, the flywheel 20 is rotated relative to the clutch drum 42 and machine input shaft 10 by drive belts connected with the grooves 36 on the flange portion 32 of the flywheel 20.

Upon operation of the solenoid valve 176 to an actuated condition in response to closing of a switch 182, high pressure fluid is conducted from the source 178 to the brake assembly 16 to operate the brake assembly to the disengaged condition. After the brake assembly 16 has been disengaged, high fluid pressure is conducted to the clutch assembly 14 to operate the clutch assembly to the engaged condition. The high pressure fluid is conducted from the annular brake cylinder chamber 76 through a pressure relief valve 184 to a rotary seal 186 connected with the flywheel 20 (FIGS. 1 and 5). The fluid pressure conducted through the rotary seal 186 enters the fluid extensible tube 58 and expands the tube radially inwardly. This moves the friction shoes 52 into engagement with the friction surface 54 on the clutch drum 42. The clutch drum 42 and machine input shaft 10 are then connected with the flywheel 20 for rotation therewith.

The high pressure fluid conducted to the brake assembly 16 operates the brake assembly to a disengaged condition in which the clutch drum 42 and friction disc 102 are free to rotate relative to the stationary members 64 and 66. The high pressure fluid conducted to the brake assembly 16 is transmitted through the piston passage 86 (FIG. 3) to the cylinder chamber 76. The high pressure fluid in the cylinder chamber 76 moves the member 66 axially away from the member 64 against the influence of the spring assembly 120. This releases the friction disc 102 for rotation relative to the force transmitting surfaces 94 and 96.

Immediately after the fluid pressure in the cylinder chamber 76 has reached a predetermined pressure sufficient to operate the brake assembly 16 to the disengaged condition, the fluid pressure conducted from the cylinder chamber 76 actuates a pressure relief valve 184. Actuation of the pressure relief valve 184 enables fluid to be conducted from the annular brake cylinder chamber 76 through the rotary seal 186 to a fluid pressure chamber in the fluid expansible tube 58. The fluid pressure conducted from the brake cylinder chamber 76 to the fluid expansible tube 58 effects operation of the clutch assembly 14 to the engaged condition immediately after the brake assembly 16 is released.

The pressure relief valve 184 is set to open when the fluid pressure in the brake cylinder chamber 76 has increased to a magnitude which is just sufficient to actuate the brake assembly 16 to the disengaged condition against the influence of the spring assembly 120. When the valve 176 is actuated, the brake assembly 16 does not begin to be disengaged until the fluid pressure in the brake cylinder chamber 76 has built up to a predetermined fluid pressure sufficient to initiate movement of the member 66 (FIG. 2 against the influence of the spring assembly 120. When this predetermined fluid pressure has been obtained in the brake cylinder chamber 76, the relief valve 184 opens to enable fluid pressure to be conducted to the clutch assembly 14 from the brake cylinder chamber 76.

Figure 6:
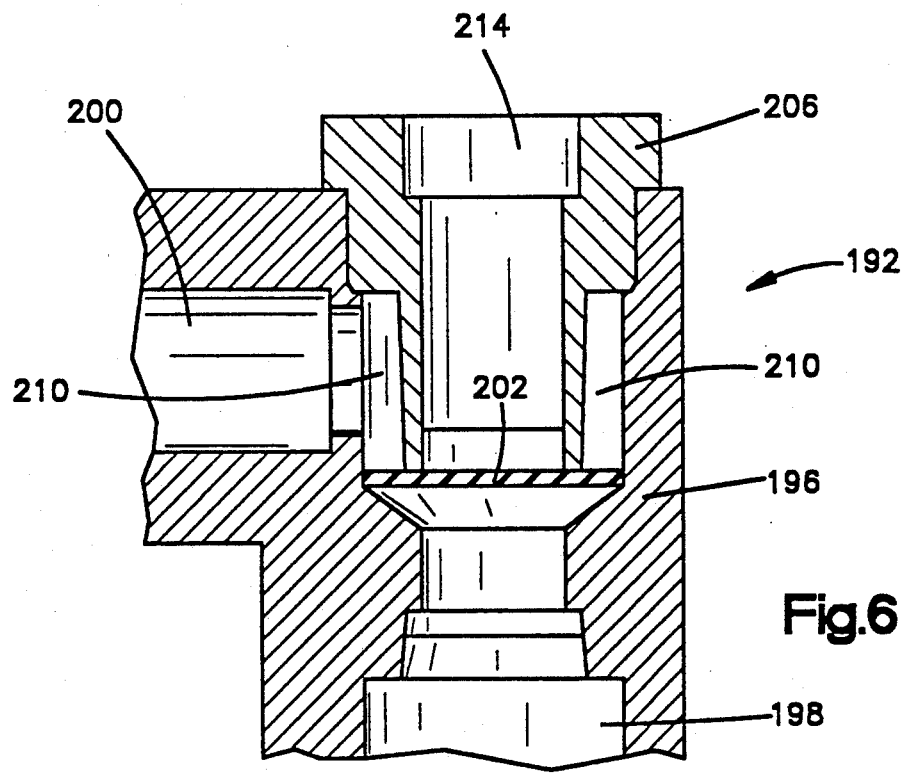
FIG. 6 is an enlarged sectional view of a quick release valve assembly used in the control circuitry of FIG. 5.

A plurality of quick release valve assemblies 192 are provided in the control circuitry 172. Each of the quick release valve assemblies 192 (FIG. 6) enables fluid to be normally conducted to and quickly vented from the clutch assembly 14 or the brake assembly 16. The quick release valve assembly 192 includes a generally cylindrical valve body 196. The valve body 196 is connected with a conduit 198 leading to the solenoid valve 176 and a conduit 200 leading to either the clutch assembly 14 or the brake assembly 16, depending upon which assembly the quick release valve assembly 192 is associated.

A circular valve diaphragm 202 is disposed inside the valve body 196. A cylindrical vent plug 206 engages the upper side of the valve diaphragm 202 opposite from the valve body 196. A plurality of axially extending passages or slots 210 are provided in the side of the vent plug 206.

The valve diaphragm 202 cooperates with the vent plug 206 and valve body 196 to enable high pressure fluid to be normally conducted to the clutch assembly 14 or brake assembly 16 and to be quickly vented from the clutch or brake assembly. Thus, when high pressure fluid is being conducted from the solenoid valve 176 through the conduit 198, the high pressure fluid presses the valve diaphragm 202 upwardly (as viewed in FIG. 6) against the lower end portion of the vent plug 206. At the same time, the periphery of the valve diaphragm 202 is deflected upwardly to enable fluid to flow from the conduit 198 through the passages or slots 210 in the vent plug 206 to the conduit 200 leading to the clutch assembly 14 or brake assembly 16.

When the solenoid valve 176 is operated to vent the clutch assembly 14 and brake assembly 16, fluid pressure in the conduit 198 quickly drops to atmospheric pressure. When this occurs, the relatively high pressure fluid in the conduit 200 presses the valve diaphragm 202 downwardly to seal against the valve body 196. As this occurs, the valve diaphragm moves away from the lower end (as viewed in FIG. 6) of the vent plug 206 and high pressure fluid from the conduit 200 flows through the slots 210, around the lower end of the vent plug 206 and to the atmosphere through an opening 214 in the vent plug.

Two quick release valve assemblies 192 are provided in the control circuitry 172. One of the quick release valve assemblies 192a vents the brake assembly 16 to atmosphere and the other quick release valve assembly 192b vents the clutch assembly 14 to atmosphere. The quick release valve assembly 192b associated with the clutch assembly 14 is actuated to vent the clutch assembly to atmosphere only after the fluid pressure in the brake cylinder chamber 76 starts to decrease. To further enhance the quickness of venting the clutch assembly 14 to atmosphere, a solenoid valve, similar to valve 176, could be added to the stationary side of rotary seal 186, with pressure source 178 being replaced by brake cylinder 76 pressure conducted through relief valve 184. The second solenoid valve, when disengaged, allows a shorter conduit to initiate a decrease in clutch line pressure, subsequently allowing the clutch assembly to vent to atmosphere through quick release valve assembly 192b.

The basic construction and mode of operation of the quick release valve assembly 192 is the same as is described in U.S. Pat. No. 4,874,068 entitled "Clutch and Brake Rapid Exhaust Manifold", and issued on Oct. 17, 1989. In addition, the rotary seal 186 has the same construction as the rotary seal disclosed in the aforementioned U.S. Pat. No. 4,874,068.

In view of the foregoing description, it is apparent that the improved secondary coupling assembly 16 is used as a brake assembly. However, the secondary coupling assembly 16 could be used as a clutch assembly if desired. The brake assembly 16 includes an annular piston 70 which extends axially outwardly from a first or base member 64. The annular piston 70 extends into an annular cylinder 76 formed in a second base member 66.

Radially extending force transmitting surfaces 94 and 96 are disposed radially inwardly of the piston and cylinder 70 and 76. The force transmitting surfaces 94 and 96 engage opposite sides 104 and 106 of the friction disc 102. The force transmitting surfaces 94 and 96 are pressed against the friction disc 102 by a spring assembly 120. The annular piston 70 and cylinder 76 cooperate to at least partially block a flow of contaminants in a radially inward direction toward the force transmitting surfaces 94 and 96 and friction disc 102.

Cooling air for the brake assembly 16 can flow through passages 118 which extend radially through the piston 70. The cooling air passages 118 are only formed in the lower half of the annular piston 70. Therefore, contaminants cannot enter the passages 118 under the influence of gravity. However, contaminants can flow out of the brake assembly 16 through the passages 118 under the influence of gravity, centrifugal force, and windage.

The spring assembly 120 includes an annular array of axially extending posts 128. Springs 138 are disposed on the posts 128. Arcuate spring retainer elements 152 and 154 are mounted on the posts 128 to hold the springs 138 in place. In order to disengage the brake assembly 16 against the influence of the spring assembly 120, axially extending passages 86 are formed in the annular piston 70 to enable fluid to be conducted under pressure into the chamber 76 formed between the piston 70 and cylinder.

Although the brake assembly 16 could be used in many different environments, it is preferred to use the brake assembly in a coupling assembly 12 which includes a flywheel 20 and a clutch assembly 14. When the clutch assembly 14 is engaged, force is transmitted from the flywheel 20 through the clutch assembly to a driven member 10. When the clutch assembly 14 is disengaged, the brake assembly 16 holds the driven member 10 against rotation. In order to make the coupling assembly 12 as compact as possible, the brake spring assembly 120 extends into an annular space 126 located between the clutch assembly 14 and flange 32 on the flywheel 20. It should be understood that the brake assembly 16 can be used by itself, without the clutch assembly 14 and flywheel 20, if desired.

The clutch assembly 14 is operated from a disengaged condition to an engaged condition after fluid pressure in the brake assembly 16 has increased to a fluid pressure sufficient to at least initiate operation of the brake assembly to a disengaged condition. Thus, fluid pressure for operating the clutch assembly 14 is conducted from a cylinder chamber 76 in the brake assembly 16. A valve 184 is operated to an open condition under the influence of fluid pressure in the brake cylinder chamber 76 to enable fluid pressure to be conducted from the brake cylinder chamber to the clutch assembly 14 after a predetermined pressure has been obtained in the brake cylinder chamber. The predetermined fluid pressure at which the valve 184 opens is a pressure which is sufficient to at least initiate operation of the brake assembly 16 toward the disengaged condition.

Having described one specific preferred embodiment of the invention, the following is claimed:

1. A coupling assembly, said coupling assembly comprising first and second members, an annular piston extending axially outwardly from said first member, annular cylinder surface means connected with said second member and forming an annular cylinder chamber having an axially facing open end portion, said annular piston extending through the axially open end portion of said cylinder chamber, a first annular force transmitting surface connected with said first member and disposed radially inwardly of said annular piston, a second annular force transmitting surface connected with said second member and disposed radially inwardly of said annular cylinder surface means, a circular friction disc having first and second radially extending side surfaces, said first side surface of said friction disc being disposed in abutting engagement with said first annular force transmitting surface and said second side surface of said friction disc being disposed in abutting engagement with said second annular force transmitting surface, said annular piston and said annular cylinder surface means being disposed radially outwardly of and extending around said friction disc, said annular piston and annular cylinder surface means cooperating to at least partially block a flow of contaminants in a radially inward direction toward said first and second annular force transmitting surfaces, and a clutch assembly which is operable under the influence of fluid pressure between an engaged condition in which said clutch assembly is effective to transmit force and a disengaged condition in which said clutch assembly is ineffective to transmit force, first passage means for conducting fluid pressure to said annular cylinder chamber, and second passage means extending between said annular cylinder chamber and said clutch assembly for conducting fluid pressure from said annular cylinder chamber to said clutch assembly to effect operation of said clutch assembly between the engaged and disengaged conditions under the influence of fluid pressure conducted from said annular cylinder chamber.

2. A coupling assembly as set forth in claim 1 further including clutch means connected with said friction disc and operable between an engaged condition in which said clutch means is effective to transmit force to said friction disc and a disengaged condition in which said clutch means is ineffective to transmit force to said friction disc.

3. A coupling assembly as set forth in claim 1 further including spring means disposed radially inwardly of said annular piston and annular cylinder surface means and disposed radially outwardly of said friction disc for urging said first and second force transmitting surfaces into abutting engagement with said first and second side surfaces of said friction disc.

4. A coupling assembly as set forth in claim 3 wherein said spring means includes an annular array of posts connected with one of said members and extending through openings in the other of said members and an annular array of spring elements mounted on said posts.

5. A coupling assembly as set forth in claim 4 further including a plurality of arcuate spring retainer elements disposed in an annular array between axially outer end portions of said posts and said spring elements for retaining said spring elements in place on said posts.

6. A coupling assembly as set forth in claim 4 further including clutch means connected with said friction disc and disposed radially inwardly of said annular array of posts and said annular array of spring elements, said clutch means including an annular friction surface, an annular base disposed in a coaxial relationship with said annular friction surface, an annular array of friction shoes disposed between said base and said friction surface and being engageable with said friction surface, and annular fluid extensible tube means which is disposed between said base and said annular array of friction shoes, said tube means being radially extensible under the influence of fluid pressure to press said friction shoes against said friction surface.

7. A coupling assembly as set forth in claim 6 further including a flywheel having a circular hub, an annular flange portion circumscribing said hub, and a connector section extending between said hub and flange portion, said clutch means being connected with said connector section of said flywheel, said flange portion of said flywheel being disposed radially outwardly of said clutch means, said annular array of posts and said annular array of spring elements being at least partially disposed radially inwardly of said flange portion of said flywheel and radially outwardly of said clutch means.

8. A coupling assembly as set forth in claim 1 wherein said annular piston is formed as one piece with said first member, said annular cylinder surface means being formed as one piece with said second member.

9. A coupling assembly as set forth in claim 8 wherein said first annular force transmitting surface is formed as one piece with said first member and is disposed in a plane which extends in a radial direction relative to said annular piston, said second annular force transmitting surface being formed as one piece with said second member and being disposed in a plane which extends in a radial direction relative to said annular cylinder surface means.

10. A coupling assembly as set forth in claim 1 further including passage means extending axially through said annular piston for conducting fluid to and from said annular cylinder chamber, and control valve means for controlling fluid flow through said passage means.

11. A coupling assembly as set forth in claim 10 wherein said control valve means includes quick release valve means mounted on a side of said first member opposite from said annular piston, said quick release valve means having an inlet for receiving fluid under pressure to be conducted to said passage means and an outlet through which fluid pressure is vented from said passage means, said quick release valve means being operable from a first condition enabling fluid to flow from said inlet to said passage means and blocking fluid flow from said passage means to said outlet to a second condition enabling fluid to flow from said passage means to said outlet and blocking fluid flow between said passage means and said inlet in response to the fluid pressure in said passage means exceeding the fluid pressure at said inlet.

12. A coupling assembly as set forth in claim 1 further including valve means for blocking the transmission of fluid pressure from said annular cylinder chamber to said clutch assembly until the fluid pressure in said annular cylinder chamber exceeds a predetermined fluid pressure.

13. A coupling assembly, said coupling assembly comprising a rotatable flywheel, said rotatable flywheel including a circular hub portion, a circular flange portion extending around said hub portion, and a connector portion extending between said hub and flange portions, an annular clutch assembly connected with said connector portion of said flywheel and with a rotatable force transmitting element for transmitting force between said flywheel and force transmitting element, said annular clutch assembly including an annular base having a central axis which is coincident with the axis of rotation of said flywheel, an annular friction surface disposed in a coaxial relationship with said annular base of said clutch assembly, an annular array of friction shoes disposed between said annular base and said annular friction surface and engageable with said annular friction surface, and annular fluid extensible tube means disposed between said annular base of said clutch assembly and said annular array of friction shoes, said tube means being radially extensible to press said annular array of friction shoes against said friction surface, and a brake assembly connected with the force transmitting element and a stationary element, said brake assembly including first and second members connected with the stationary element, piston means connected with said first member, cylinder chamber means connected with said second member and opening toward said piston means, said piston means extending into said cylinder chamber means and cooperating with said cylinder chamber means to hold fluid under pressure, a first annular force transmitting surface connected with said first member and having a central axis which is coincident with the axis of rotation of said flywheel, a second annular force transmitting surface connected with said second member and having a central axis which is coincident with the axis of rotation of said flywheel, a circular friction disc connected with the force transmitting element and having a central axis which is coincident with the axis or rotation of said flywheel, said friction disc having first and second radially extending annular side surfaces, said first side surface of said friction disc being disposed in abutting engagement with said first annular force transmitting surface and said second side surface of said friction disc being disposed in abutting engagement with said second annular force transmitting surface, spring means connected with said first and second members for urging said first and second force transmitting surfaces into abutting engagement with said first and second side surfaces of said friction disc, said spring means including an annular array of posts connected with one of said first and second members and having a central axis which is coincident with the axis of rotation of said flywheel, each post of said annular array of posts being at least partially disposed in an annular space which is disposed radially inwardly of said circular flange portion of said flywheel and which is disposed radially outwardly of said annular clutch assembly, and an annular array of spring elements having a central axis which is coincident with the axis of rotation of said flywheel, each spring element of said annular array of spring elements being connected with at least one of said posts of said annular array of posts and being at least partially disposed in the annular space which is disposed radially inwardly of said circular flange portion of said flywheel and is disposed radially outwardly of said clutch assembly.

14. A coupling assembly as set forth in claim 13 wherein said annular base of said clutch assembly is fixedly connected with said connector portion of said flywheel and said annular friction surface is fixedly connected with the force transmitting element.

15. A coupling assembly as set forth in claim 14 wherein said annular array of friction shoes is disposed radially inwardly of said annular base of said clutch assembly and is disposed radially outwardly of said annular friction surface, said annular tube means being extensible radially inwardly to press said annular array of friction shoes against said friction surface.

16. A coupling assembly as set forth in claim 13 wherein said piston means has an annular configuration and has a central axis which is coincident with the axis of rotation of said flywheel, said cylinder chamber means having an annular configuration and having a central axis which is coincident with the axis of rotation of said flywheel, said annular piston means and said annular cylinder chamber means cooperating to at least partially block a flow of contaminants in a radially inward direction toward said first and second annular force transmitting surfaces.

17. A coupling assembly as set forth in claim 16 wherein said annular piston means is formed as one piece with said first member, and said annular cylinder chamber means is formed as one piece with said second member.

18. A coupling assembly as set forth in claim 16 further including surface means for defining a plurality of passages extending radially through said annular piston means to enable material to flow between radially inner and outer sides of said annular piston means.

19. A coupling assembly as set forth in claim 13 wherein said spring means includes a plurality of arcuate spring retainer elements disposed in an annular array between axially outer end portions of said posts and said spring elements for retaining said spring elements in place on said posts, said annular array of spring elements and said annular array of spring retainer elements being at least partially disposed in the annular space which is disposed radially inwardly of said circular flange portion of said flywheel and which is disposed radially outwardly of said annular clutch assembly.

20. A coupling assembly as set forth in claim 13 further including passage means extending through said piston means for conducting fluid to and from a chamber formed by cooperation between said piston means and said cylinder chamber means.

21. A coupling assembly as set forth in claim 13 further including first passage means for conducting fluid pressure to said cylinder chamber means and second passage means extending between said cylinder chamber means and said annular fluid extensible tube means for conducting fluid pressure from said cylinder chamber means to said fluid extensible tube means to effect radial expansion of said fluid extensible tube means under the influence of fluid pressure conducted from said cylinder chamber means.

22. A coupling assembly as set forth in claim 21 further including valve means for blocking the transmission of fluid pressure from said cylinder chamber means to said fluid extensible tube means until the fluid pressure in said cylinder chamber means exceeds a predetermined fluid pressure.

23. A coupling assembly, said coupling assembly comprising first and second members, an annular piston extending axially outwardly from said first member, annular cylinder surface means connected with said second member and forming an annular cylinder chamber having an axially facing open end portion, said annular piston extending through the axially open end portion of said cylinder chamber, a first annular force transmitting surface connected with said first member and disposed radially inwardly of said annular piston, a second annular force transmitting surface connected with said second member and disposed radially inwardly of said annular cylinder surface means, a circular friction disc having first and second radially extending side surfaces, said first side surface of said friction disc being disposed in abutting engagement with said first annular force transmitting surface and said second side surface of said friction disc being disposed in abutting engagement with said second annular force transmitting surface, said annular piston and said annular cylinder surface means being disposed radially outwardly of and extending around said friction disc, said annular piston and annular cylinder surface means cooperating to at least partially block a flow of contaminants in a radially inward direction toward said first and second annular force transmitting surfaces, and surface means for defining a plurality of passages extending radially through said annular piston for enabling material to flow between radially inner and outer sides of said annular piston.

24. A coupling assembly as set forth in claim 23 wherein said circular friction disc is radially aligned with a radially inner end portion of at least one of said passages to enable said friction disc to be visually inspected through at least said one of said passages.

25. A coupling assembly, said coupling assembly comprising first and second members, piston means connected with said first member, cylinder chamber means connected with said second member and opening toward said piston means, said piston means extending into said cylinder chamber means and cooperating with said cylinder chamber means to hold fluid under pressure, a first annular force transmitting surface connected with said first member, said piston means being disposed radially outwardly of said first annular force transmitting surface, a second annular force transmitting surface connected with said second member, said cylinder chamber means being disposed radially outwardly of said second annular force transmitting surface, a circular friction disc having first and second radially extending side surfaces, said first side surface of said friction disc being disposed in abutting engagement with said first annular force transmitting surface and said second side surface of said friction disc being disposed in abutting engagement with said second annular force transmitting surface, said piston means and said cylinder chamber means being disposed radially outwardly of said friction disc, spring means connected with said first and second members for urging said first and second force transmitting surfaces into abutting engagement with said first and second side surfaces of said friction disc, said spring means including an annular array of posts connected with one of said first and second members and having a central axis which is coincident with the central axes of said first and second force transmitting surfaces, and an annular array of spring elements having a central axis which is coincident with the central axes of said first and second force transmitting surfaces, each spring element of said annular array of spring elements being connected with at least one of said posts of said annular array of posts, and a rotatable flywheel having an annular flange portion and an annular clutch assembly connected with said rotatable flywheel, each post of said annular array of posts being at least partially disposed in an annular space which is disposed radially inwardly of said annular flange portion of said flywheel and is disposed radially outwardly of said annular clutch assembly.

26. A coupling assembly as set forth in claim 25 further including surface means connected with each of said posts for limiting the extent of relative movement between said first and second members tending to separate said first and second members.

27. A coupling assembly as set forth in claim 25 wherein said piston means has an annular configuration and has a central axis which is coincident with the central axes of said first and second force transmitting surfaces, said cylinder chamber means having an annular configuration and having a central axis which is coincident with the central axes of said first and second annular force transmitting surfaces, said annular piston and said annular cylinder chamber means cooperating to at least partially block a flow of contaminants in a radially inwardly direction toward said first and second annular force transmitting surfaces.

28. A coupling assembly as set forth in claim 25 further including passage means extending through said piston means for conducting fluid to and from a chamber formed by cooperation between said piston means and said cylinder chamber means.

29. A coupling assembly, said coupling assembly comprising first and second members, piston means connected with said first member, cylinder chamber means connected with said second member and opening toward said piston means, said piston means extending into said cylinder chamber means and cooperating with said cylinder chamber means to hold fluid under pressure, a first annular force transmitting surface connected with said first member, said piston means being disposed radially outwardly of said first annular force transmitting surface, a second annular force transmitting surface connected with said second member, said cylinder chamber means being disposed radially outwardly of said second annular force transmitting surface, a circular friction disc having first and second radially extending side surfaces, said first side surface of said friction disc being disposed in abutting engagement with said first annular force transmitting surface and said second side surface of said friction disc being disposed in abutting engagement with said second annular force transmitting surface, said piston means and said cylinder chamber means being disposed radially outwardly of said friction disc, spring means connected with said first and second members for urging said first and second force transmitting surfaces into abutting engagement with said first and second side surfaces of said friction disc, said spring means including an annular array of posts connected with one of said first and second members and having a central axis which is coincident with the central axes of said first and second force transmitting surfaces, an annular array of spring elements having a central axis which is coincident with the central axes of said first and second force transmitting surfaces, each spring element of said annular array of spring elements being connected with at least one of said posts of said annular array of posts, and a plurality of arcuate spring retainer elements disposed in an annular array between axially outer end portions of said posts and said spring elements for retaining said spring elements in place on said posts, each of said spring retainer elements being disposed in engagement with a plurality of said posts and being disposed in a lapped relationship with a plurality of other spring retainer elements of said annular array of spring retainer elements.

30. A coupling assembly as set forth in claim 29 further including surface means connected with each of said posts for limiting the extent of relative movement between said first and second members tending to separate said first and second members.

31. A coupling assembly, said coupling assembly comprising first and second members, piston means connected with said first member, cylinder chamber means connected with said second member and opening toward said piston means, said piston means extending into said cylinder chamber means and cooperating with said cylinder chamber means to hold fluid under pressure, a first annular force transmitting surface connected with said first member, said piston means being disposed radially outwardly of said first annular force transmitting surface, a second annular force transmitting surface connected with said second member, said cylinder chamber means being disposed radially outwardly of said second annular force transmitting surface, a circular friction disc having first and second radially extending side surfaces, said first side surface of said friction disc being disposed in abutting engagement with said first annular force transmitting surface and said second side surface of said friction disc being disposed in abutting engagement with said second annular force transmitting surface, said piston means and said cylinder chamber means being disposed radially outwardly of said friction disc, said piston means having an annular configuration and having a central axis which is coincident with the central axes of said first and second force transmitting surfaces, said cylinder chamber means having an annular configuration and having a central axis which is coincident with the central axes of said first and second annular force transmitting surfaces, said annular piston and said annular cylinder chamber means cooperating to at least partially block a flow of contaminants in a radially inwardly direction toward said first and second annular force transmitting surfaces, surface means for defining a plurality of passages extending radially through said annular piston means to enable material to flow between radially inner and outer sides of said annular piston means, spring means connected with said first and second members for urging said first and second force transmitting surfaces into abutting engagement with said first and second side surfaces of said friction disc, said spring means including an annular array of posts connected with one of said first and second members and having a central axis which is coincident with the central axes of said first and second force transmitting surfaces, and an annular array of spring elements having a central axis which is coincident with the central axes of said first and second force transmitting surfaces, each spring element of said annular array of spring elements being connected with at least one of said posts of said annular array of posts.

32. A coupling assembly as set forth in claim 30 further including passage means extending through said piston means for conducting fluid to and from a chamber formed by cooperation between said piston means and said cylinder chamber means.

33. A coupling assembly, said coupling assembly comprising a rotatable input member, a clutch assembly connected with said rotatable input member and a rotatable force transmitting element, said clutch assembly being operable under the influence of fluid pressure from a disengaged condition in which said clutch assembly is ineffective to transmit force between said input member and force transmitting element to an engaged condition in which said clutch assembly is effective to transmit force between said input member and force transmitting element, a brake assembly connected with the force transmitting element and a stationary element, said brake assembly including piston and cylinder means which at least partially defines a brake cylinder chamber, said brake assembly being operable under the influence of fluid pressure in the brake cylinder chamber from an engaged condition in which said brake assembly retains the force transmitting element against rotation relative to the stationary member to a disengaged condition in which said brake assembly is ineffective to retain the force transmitting element against rotation relative to the stationary member, first conduit means for conducting fluid pressure to the brake cylinder chamber to effect operation of said brake assembly from the engaged condition to the disengaged condition, and second conduit means for conducting fluid pressure from said brake cylinder chamber to said clutch assembly to operate said clutch assembly from the disengaged condition to the engaged condition.

34. A coupling assembly as set forth in claim 33 further including valve means for blocking the transmission of fluid pressure from said brake cylinder chamber through said second conduit means to said clutch assembly until the fluid pressure in said brake cylinder chamber exceeds a predetermined fluid pressure.

35. A coupling assembly as set forth in claim 33 wherein said brake assembly includes first and second members, said piston and cylinder means including an annular piston extending axially outwardly from said first member and annular cylinder surface means connected with said second member and forming an annular cylinder chamber having an axially facing open end portion, said annular piston extending through the axially open end portion of said cylinder chamber, said brake assembly further including a first annular force transmitting surface connected with said first member and disposed radially inwardly of said annular piston, a second annular force transmitting surface connected with said second member and disposed radially inwardly of said annular cylinder surface means, a circular friction disc having first and second radially extending side surfaces, said first side surface of said friction disc being disposed in abutting engagement with said first annular force transmitting surface and said second side surface of said friction disc being disposed in abutting engagement with said second annular force transmitting surface, said annular piston and said annular cylinder surface means being disposed radially outwardly of and extending around said friction disc, said annular piston and annular cylinder surface means cooperating to at least partially block a flow of contaminants in a radially inward direction toward said first and second annular force transmitting surfaces.

36. A coupling assembly as set forth in claim 35 further including spring means disposed radially inwardly of said annular piston and annular cylinder surface means and disposed radially outwardly of said friction disc for urging said first and second force transmitting surfaces into abutting engagement with said first and second side surfaces of said friction disc.

37. A coupling assembly as set forth in claim 36 wherein said spring means includes an annular array of posts connected with one of said members and extending through openings in the other of said members and an annular array of spring elements mounted on said posts.

38. A coupling assembly as set forth in claim 33 wherein said rotatable input member is a rotatable flywheel, said rotatable flywheel including a circular hub portion, a circular flange portion extending around said hub portion, and a connector portion extending between said hub and flange portions, said clutch assembly being connected with said connector portion of said flywheel and with the rotatable force transmitting element for transmitting force between said flywheel and force transmitting element, said clutch assembly including an annular base having a central axis which is coincident with the axis of rotation of said flywheel, an annular friction surface disposed in a coaxial relationship with said annular base of said clutch assembly, an annular array of friction shoes disposed between said annular base and said annular friction surface and engageable with said annular friction surface, and annular fluid extensible tube means disposed between said annular base of said clutch assembly and said annular array of friction shoes, said tube means being radially extensible to press said annular array of friction shoes against said friction surface, said brake assembly including first and second members connected with the stationary element, said piston and cylinder means including piston means connected with said first member and cylinder chamber means connected with said second member and opening toward said piston means, said piston means extending into said cylinder chamber means and cooperating with said cylinder chamber means to hold fluid under pressure, said brake assembly further including a first annular force transmitting surface connected with said first member and having a central axis which is coincident with the axis of rotation of said flywheel, a second annular force transmitting surface connected with said second member and having a central axis which is coincident with the axis of rotation of said flywheel, a circular friction disc connected with the force transmitting element and having a central axis which is coincident with the axis or rotation of said flywheel, said friction disc having first and second radially extending annular side surfaces, said first side surface of said friction disc being disposed in abutting engagement with said first annular force transmitting surface and said second side surface of said friction disc being disposed in abutting engagement with said second annular force transmitting surface, spring means connected with said first and second members for urging said first and second force transmitting surfaces into abutting engagement with said first and second side surfaces of said friction disc, said spring means including an annular array of posts connected with one of said first and second members and having a central axis which is coincident with the axis of rotation of said flywheel, each post of said annular array of posts being at least partially disposed in an annular space which is disposed radially inwardly of said circular flange portion of said flywheel and which is disposed radially outwardly of said clutch assembly, and an annular array of spring elements having a central axis which is coincident with the axis of rotation of said flywheel, each spring element of said annular array of spring elements being connected with at least one of said posts of said annular array of posts and being at least partially disposed in the annular space which is disposed radially inwardly of said circular flange portion of said flywheel and is disposed radially outwardly of said clutch assembly.

39. A coupling assembly as set forth in claim 38 wherein said piston means has an annular configuration and has a central axis which is coincident with the axis of rotation of said flywheel, said cylinder chamber means having an annular configuration and having a central axis which is coincident with the axis of rotation of said flywheel, said annular piston means and said annular cylinder chamber means cooperating to at least partially block a flow of contaminants in a radially inward direction toward said first and second annular force transmitting surfaces.

40. A coupling assembly as set forth in claim 39 wherein said annular piston means is formed as one piece with said first member, and said annular cylinder chamber means is formed as one piece with said second member.

41. A coupling assembly as set forth in claim 40 further including surface means for defining a plurality of passages extending radially through said annular piston means to enable material to flow between radially inner and outer sides of said annular piston means.

42. A coupling assembly, said coupling assembly comprising a clutch assembly operable under the influence of fluid pressure from a disengaged condition in which said clutch assembly is ineffective to transmit force to an engaged condition in which said clutch assembly is effective to transmit force, a brake assembly operable under the influence of fluid pressure to a disengaged condition, first conduit means for conducting fluid pressure to the brake assembly to effect operation of said brake assembly, and second conduit means for conducting fluid pressure from said brake assembly to said clutch assembly to operate said clutch assembly from the disengaged condition to the engaged condition under the influence of fluid pressure conducted from said brake assembly.

43. A coupling assembly as set forth in claim 42 further including valve means for blocking the transmission of fluid pressure from said brake assembly through said second conduit means to said clutch assembly until the fluid pressure in said brake assembly exceeds a predetermined fluid pressure.

44. A coupling assembly, said coupling assembly comprising first and second members, an annular piston extending axially outwardly from said first member, annular cylinder surface means connected with said second member and forming an annular cylinder chamber having an axially facing open end portion, said annular piston extending through the axially open end portion of said cylinder chamber, a first annular force transmitting surface connected with said first member and disposed radially inwardly of said annular piston, a second annular force transmitting surface connected with said second member and disposed radially inwardly of said annular cylinder surface means, a circular friction disc having first and second radially extending side surfaces, said first side surface of said friction disc being disposed in abutting engagement with said first annular force transmitting surface and said second side surface of said friction disc being disposed in abutting engagement with said second annular force transmitting surface, said annular piston and said annular cylinder surface means being disposed radially outwardly of and extending around said friction disc, spring means disposed radially inwardly of said annular piston and annular cylinder surface means and disposed radially outwardly of said friction disc for urging said first and second force transmitting surfaces into abutting engagement with said first and second side surfaces of said friction disc, said spring means includes an annular array of posts connected with a first one of said members and extending through openings in a second one of said members and an annular array of spring elements mounted on said posts adjacent to a side of said second one of said members opposite from said first one of said members, and clutch means connected with said friction disc and disposed radially inwardly of said annular array of posts and said annular array of spring elements, said clutch means including a cylindrical friction surface disposed adjacent to the side of said second one of said members opposite from said first one of said members and disposed radially inwardly of said annular array of posts and said annular array of spring elements, a cylindrical base disposed in a coaxial relationship with said cylindrical friction surface, an annular array of friction shoes disposed between said base and said friction surface and being engageable with said friction surface, and annular fluid extensible tube means which is disposed between said base and said annular array of friction shoes, said tube means being radially extensible under the influence of fluid pressure to press said friction shoes against said friction surface.

45. A coupling assembly as set forth in claim 44 further including a flywheel having a circular hub, an annular flange portion circumscribing said hub, and a connector section extending between said hub and flange portion, said clutch means being connected with said flywheel, said flange portion of said flywheel being disposed radially outwardly of said clutch means, said annular array of posts and said annular array of spring elements being at least partially disposed radially inwardly of said flange portion of said flywheel and radially outwardly of said clutch means.

46. A coupling assembly as set forth in claim 45 wherein said annular piston is formed as one piece with said first member, said annular cylinder surface means being formed as one piece with said second member.

47. A coupling assembly as set forth in claim 46 wherein said first annular force transmitting surface is formed as one piece with said first member and is disposed in a plane which extends in a radial direction relative to said annular piston, said second annular force transmitting surface being formed as one piece with said second member and being disposed in a plane which extends in a radial direction relative to said annular cylinder surface means.

48. A coupling assembly as set forth in claim 45 further including passage means extending axially through said annular piston for conducting fluid to and from said annular cylinder chamber, and control valve means for controlling fluid flow through said passage means.

49. A coupling assembly as set forth in claim 48 wherein said control valve means includes quick release valve means mounted on a side of said first member opposite from said annular piston, said quick release valve means having an inlet for receiving fluid under pressure to be conducted to said passage means and an outlet through which fluid pressure is vented from said passage means, said quick release valve means being operable from a first condition enabling fluid to flow from said inlet to said passage means and blocking fluid flow from said passage means to said outlet to a second condition enabling fluid to flow from said passage means to said outlet enabling fluid flow between said passage means and said inlet in response to the fluid pressure in said passage means exceeding the fluid pressure at said inlet.

* * * * *

UNITED STATES PATENT AND TRADEMARK OFFICE
CERTIFICATE OF CORRECTION

PATENT NO. : 5,178,248
DATED : January 12, 1993
INVENTOR(S) : James M. Latsko

It is certified that error appears in the above-identified patent and that said Letters Patent is hereby corrected as shown below:

Column 17, line 48, change "30" to -- 31 --.

Signed and Sealed this

Eleventh Day of January, 1994

Attest:

BRUCE LEHMAN

Attesting Officer

Commissioner of Patents and Trademarks